(12) United States Patent
Lee et al.

(10) Patent No.: US 10,599,955 B2
(45) Date of Patent: *Mar. 24, 2020

(54) VISUAL REPRESENTATIONS OF PHOTO ALBUMS

(71) Applicant: Microsoft Technology Licensing, LLC, Redmond, WA (US)

(72) Inventors: David James Lee, Redmond, WA (US); Richard Prologo, Sammamish, WA (US); Ankur Khator, Sammamish, WA (US); Joshua Debner, Seattle, WA (US); Benjamin J. Smith, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/870,250

(22) Filed: Jan. 12, 2018

(65) Prior Publication Data

US 2018/0137392 A1  May 17, 2018

Related U.S. Application Data

(63) Continuation of application No. 14/941,134, filed on Nov. 13, 2015, now Pat. No. 9,904,872.

(51) Int. Cl.
*G06K 9/62* (2006.01)
*G06K 9/00* (2006.01)
(Continued)

(52) U.S. Cl.
CPC ....... *G06K 9/6267* (2013.01); *G06K 9/00268* (2013.01); *G06K 9/00288* (2013.01);
(Continued)

(58) Field of Classification Search
None
See application file for complete search history.

(56) References Cited

U.S. PATENT DOCUMENTS

| 8,390,669 | B2* | 3/2013 | Catchpole | G06K 9/00288 348/14.08 |
| 8,670,597 | B2* | 3/2014 | Petrou | G06K 9/00288 382/116 |

(Continued)

*Primary Examiner* — Iman K Kholdebarin
(74) *Attorney, Agent, or Firm* — Alleman Hall Creasman & Tuttle LLP (57) ABSTRACT

Systems and methods for selecting representative photos for a photo album are described. An example computing device may include a display, a logic device, and a storage device storing instructions executable by the logic device to, for each known individual recognized in one or more photos of the album, determine an affinity score for that known individual indicating a connection of that known individual to a) a user of the computing device and b) a context corresponding to the album. The instructions may be further executable to select one or more known individuals based on the affinity score to be included in a subset of the known individuals recognized in one or more photos of the album, and select a representative photo of each of the subset of the known individuals to be included in one or more of a highlight photoset and a cover photo for the album.

23 Claims, 6 Drawing Sheets

(51) Int. Cl.
  *G06T 3/40*      (2006.01)
  *G06T 11/60*     (2006.01)
  *G06K 9/46*      (2006.01)
  *G06K 9/52*      (2006.01)
  *G06Q 10/10*     (2012.01)
  *G06Q 50/00*     (2012.01)

(52) U.S. Cl.
  CPC ....... *G06K 9/00677* (2013.01); *G06K 9/4671* (2013.01); *G06K 9/52* (2013.01); *G06Q 10/10* (2013.01); *G06Q 50/01* (2013.01); *G06T 3/40* (2013.01); *G06T 11/60* (2013.01)

(56) References Cited

U.S. PATENT DOCUMENTS

| | | | |
|---|---|---|---|
| 8,774,528 B2* | 7/2014 | Hibino | G06K 9/00671 382/218 |
| 8,806,380 B2* | 8/2014 | Moon | G06F 3/0482 715/856 |
| 8,832,570 B1* | 9/2014 | Marra | G06F 16/9535 715/758 |
| 8,934,661 B2* | 1/2015 | Dolson | G06F 16/58 382/100 |
| 9,904,872 B2* | 2/2018 | Lee | G06K 9/00677 |
| 2013/0308836 A1* | 11/2013 | Cheng | H04N 1/00336 382/118 |

\* cited by examiner

VISUAL REPRESENTATIONS OF PHOTO ALBUMS

CROSS REFERENCE TO RELATED APPLICATIONS

This application is a continuation of U.S. patent application Ser. No. 14/941,134, filed Nov. 13, 2015, the entire contents of which is hereby incorporated herein by reference for all purposes.

BACKGROUND

Users may capture a plurality of images over time. Such images may be organized into albums corresponding to a date/period of time, an event, or another grouping parameter.

DETAILED DESCRIPTION

Photo albums may be generated manually (e.g., with a user selecting photos for inclusion in the albums) or automatically (e.g., according to dates and/or content of the photos). In either case, the photos of the album may be tied to a particular event or other context (e.g., date, subject matter, etc.). In order to navigate a listing of photo albums, each album may be represented by a cover photo, and a user may select a cover photo or other selectable feature of the album in order to view the album and/or a summary of the album (e.g., a subset of photos in the album or a truncated version of the album).

In some album generation systems, the cover photo and photos in the summary may be manually selected by the user. In other systems (or as a default action if the user does not provide a selection), the cover photo and photos in the summary may be automatically selected based on simple criteria (e.g., a first photo, earliest dated photo, etc.). However, manually selecting photos takes time and effort, particularly when working with multiple and/or large albums. In some cases, this level of effort is prohibitive, and the user never ends up selecting a meaningful cover/summary photo. In cases where selections are made, the photos that are selected may be sub-optimal, due to the time/effort barrier or for other reasons. Important photos may be left out. Selections may be repetitive, include too many photos, and/or include less insignificant photos.

Whether through manual selection or other methods (e.g., automatic selection), sub-optimal selection of cover/summary photos diminishes the value of the album to the user. For example, the user may be less emotionally engaged by the album. The cover/summary photos may not catch the user's attention while the user is browsing albums. When presented with a sub-optimal cover/summary photo, the user may not even remember the event associated with the album.

The disclosure provides systems and methods for generating album representations including a cover photo and/or summary. The cover photo and photos included in the summary may be selected based on an intelligent rule-based mechanism. For example, the value of the cover photo and/or summary may be most closely tied to the individuals captured in the photos. Accordingly, the disclosed rule-based mechanism may include recognizing faces in the photos of an album as corresponding to known individuals, and determining 1) a connection between the user and the known individuals and/or 2) a connection between the known individuals and an event or other context of the album. Weights may be applied to the connections in order to determine known individuals that are most relevant to the album. As used herein, known individuals may refer to people corresponding to recognized faces in the photos. Individuals may also refer to animals (e.g., pets) having faces that are recognized in the photos. Some of the processes described herein may also be applied to objects recognized in the photos (e.g., faces of dolls, landmarks, and/or other objects of significance to the user), where the objects may be treated similarly to the recognized faces in the photos.

Photos including the known individuals may be selected for the cover photo and/or summary of the album. In some examples, the selected photos may be altered (e.g., cropped) in order to focus on the recognized faces of the individuals when presenting the cover photo and/or summary to the user. The rule-based mechanism and associated photo album representation are described in more detail below.

Figure 1:
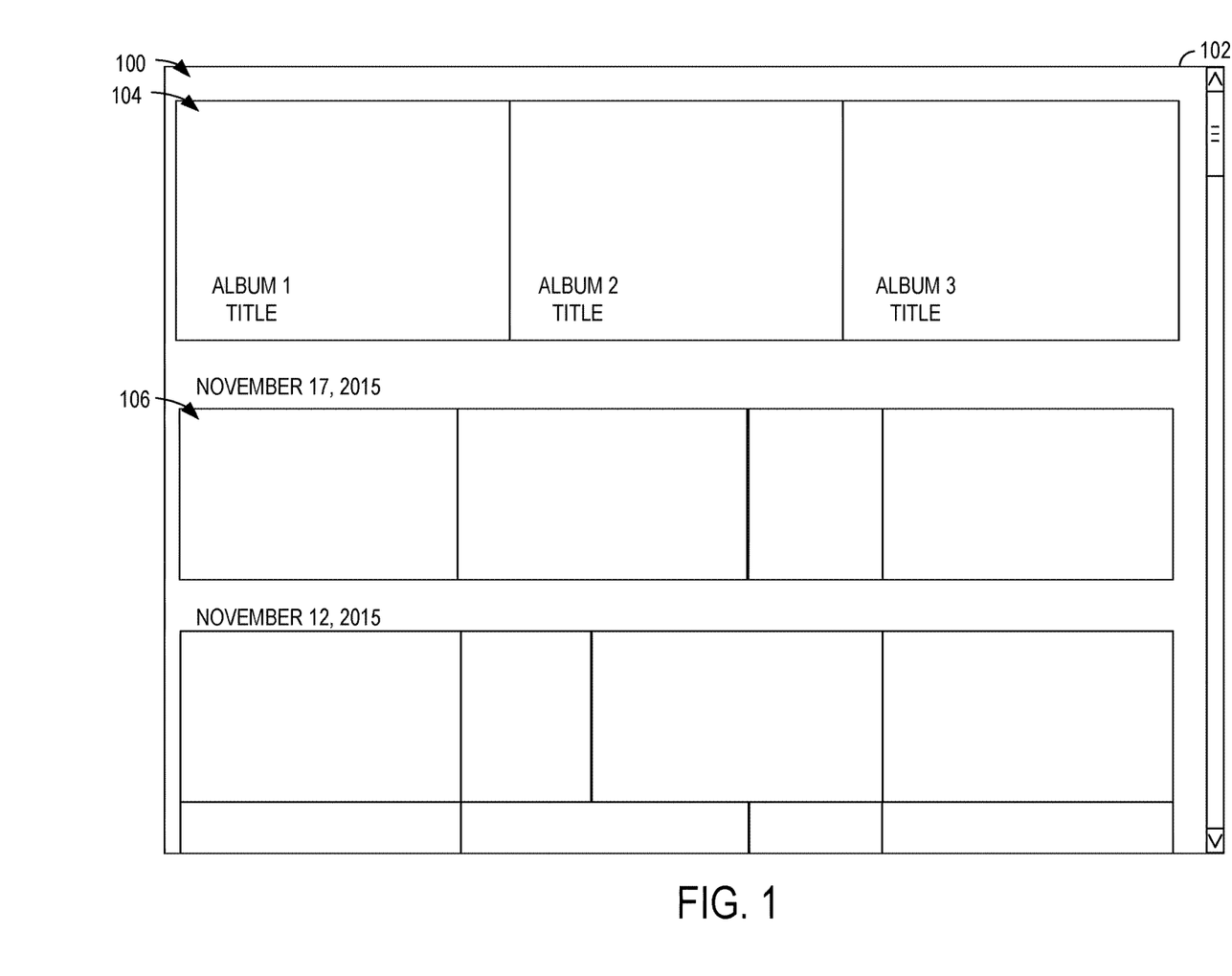
FIG. 1 shows an example user interface for a collection of photos and photo albums.

FIG. 1 shows an example user interface 100 for a collection of photos as displayed on a display device 102 (e.g., a display integrated with and/or coupled to a computing device). As shown, the user interface 100 includes indicators and/or representations of a plurality of albums 104 and a plurality of photos 106 associated with a user. For example, the illustrated representations of albums 104 may include selectable cover photos for the albums (e.g., each selectable to view the photos of the associated album and/or an album summary), and the representations of the photos 106 may include selectable thumbnails for the photos (e.g., each selectable to view a larger/original sized version of the associated photo). Any suitable representation or indicator for albums and photos may be viewable in user interface 100.

In the illustrated example, the photos 106 are organized by date and represent photos captured by the user and/or uploaded by the user to an application associated with the user interface 100. In other examples, photos 106 may be organized in a different manner (e.g., by subject, file name, size, location, user-selected order, and/or other parameter). Some or all of the photos 106 may be included in one or more of the albums 104, and additional photos or albums may be viewed by scrolling the user interface side-to-side, up-and-down, or otherwise adjusting the view of the user interface (e.g., via user input such as swiping a touch screen of the display device 102, scrolling a wheel of a mouse connected to the display device, performing a gesture, and/or another input mechanism).

Each album 104 may be represented by a cover photo for that album. For example, the illustrated album titles may be overlaid over (or positioned to one side of) the cover photo for that album. The cover photo may include a photo from that album. The cover photo may be an unaltered photo from the album or a cropped, resized, or otherwise altered photo from the album representing the contents of the album. The cover photo may also serve as a selectable user interface element of user interface 100. For example, selecting the cover photo of a given album (e.g., by tapping, clicking, performing a selection gesture, and/or otherwise directing user input toward the cover photo) may cause the given album to be selected for viewing. An example view of a selected album is shown in FIG. 2.

Figure 2:
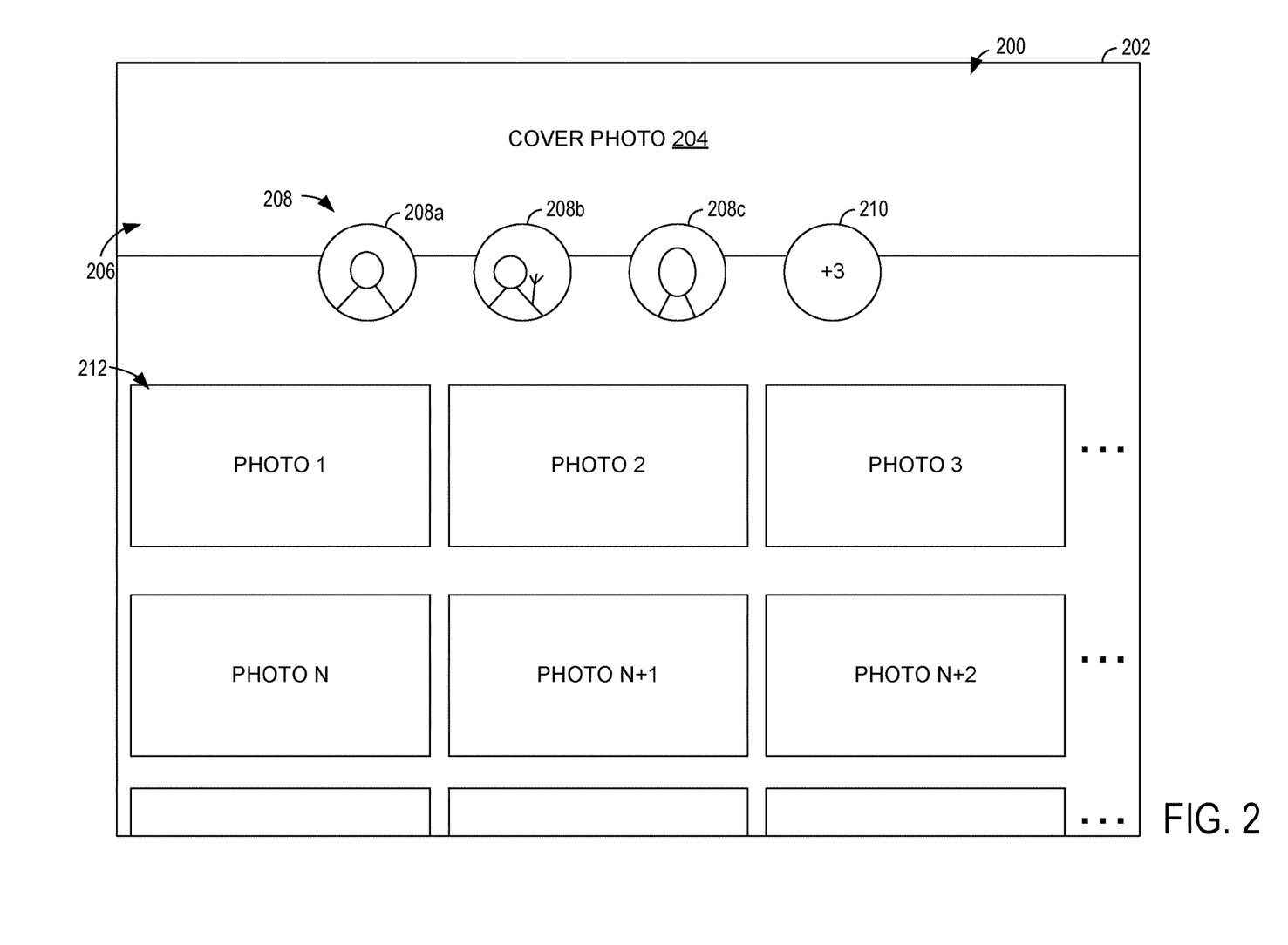
FIG. 2 shows an example user interface for a photo album.

FIG. 2 shows a photo album 200 as displayed on a display device 202 (e.g., a display integrated with and/or coupled to a computing device). The photo album 200 may be an example of a selected one of photo albums 104 of FIG. 1. For example, the view of photo album 200 may be presented responsive to user selection of a cover photo for a corresponding photo album in user interface 100 of FIG. 1. A cover photo 204 may be presented over the top of the photo album (e.g., along a header region 206 of a displayed page)—or otherwise placed to indicate its association with the album. The cover photo may be the same photo as selected from a prior user interface screen (e.g., the view of the user interface 100 of FIG. 1), and may be altered in order to conform to the spacing present in the photo album 200. For example, the cover photo for a displayed album may be cropped, resized, stretched, and/or otherwise altered from an original photo in order to form an altered (e.g., cropped/resized) version of the photo that fits in the header region 206 of the album 200. In this way, the cover photo may be altered in order to be appropriately dimensioned given the amount of screen space available for the cover photo.

While the cover photo 204 may provide a single-photo representation of the album as a whole, the highlight photoset 208 may provide a fuller and/or otherwise different representation of the contents of the album by indicating individuals who appear in the album. For example, each photo (e.g., 208*a-c*) of the photoset 208 may include a cropped version of a photo of the album that includes a recognized face of an individual. The individuals included in the highlight photoset may include individuals who appear in the album and are determined to have a close connection to the user (e.g., the owner of the album) and/or the context of the album. For example, a relationship of recognized individuals in the album to the user may be determined based on information gathered from various sources, such as a contact history with the user, social networking profiles for the user/individual, user-entered relationship data, and/or other information. The connection of the individual to the context of the album may be identified based on information gathered from the same and/or additional or alternative sources, including information regarding the frequency of appearance of the individual in the photo album, a link between the date/event captured by the album and the individual, and/or other information. The identification of connections between the individuals and the user/album are described in more detail below with respect to FIGS. 4 and 5.

As illustrated, the highlight photoset 208 may at least partially overlay the cover photo and be cropped such that only a face of a recognized individual is present in the cropped version of the photo. For example, only a single face (e.g., that of the recognized individual) may be present in the cropped version of the photo and no other faces may be present. As another example, one or more recognized faces of known individuals may be present in the cropped version of the photo, and other features from the photo (e.g., landmarks, background faces/objects, etc.) may not be present in the cropped version of the photo. In still another example, the cropped version may be cropped to a predetermined size/shape (e.g., the illustrated circle) and the recognized face of a known individual in the photo may be centered within the predetermined size/shape of the cropped photo. In other examples, the highlight photoset 208 may occupy other regions that indicate association with the album.

As further illustrated, an additional user interface element 210 may be displayed alongside the highlight photoset 208 with an indication of additional known individuals that are recognized as being included in the photos of the album (e.g., 3 additional individuals in the illustrated example). The additional known individuals may include remaining individuals having an affinity score higher than a threshold (e.g., the affinity score being determined as described in more detail below with respect to FIG. 3), where the individuals shown in the highlight photoset include those individuals having the top affinity scores (e.g., the top three in this example, though the album may include any number of top affinity scores in other examples). The number of photos in the highlight photoset and/or the number of additional known individuals may be determined based on user preference settings, based on the size of the album (e.g., the number of photos in the album), the number of different recognized faces in the album, the amount of screen real estate available for the highlight photoset, and/or any other suitable factor.

The user interface element 210 may be selectable in order to view the remaining individuals. The view of the remaining individuals may be presented in any suitable manner, including a listing of names or other identifiers of the additional individuals, a display of photo(s) including the additional individuals, a display of cropped versions of photo(s) including the additional individuals (e.g., matching the appearance, size, and/or shape of the highlight photoset 208), and/or any other presentation of data indicating the additional individuals.

The photos 212 of the album 200 (e.g., all of the photos of the album) may be presented below the cover photo 204 and highlight photoset 208. For example, a subset of the photos may be presented on a first displayable page of the album 200, and additional photos of the album (e.g., all of the remaining photos of the album) may be presented responsive to scrolling, swiping, and/or otherwise navigating to a different page or view of the album. The photos 212 may be organized in any suitable manner, including by date, filename, size, affinity score, and/or other metric. Other views of the photos 212 may be presented, such as a layout having a hierarchical structure, showing the cover photo, the highlight photos, the additional known individuals, thumbnails of the photos of the album, and/or original/larger-sized versions of the photos from the album (relative to the thumbnails) in some sequential order (e.g., responsive to selection, scrolling, etc.). Any of the aspects of the album (e.g., cover photo, highlight photoset, photos of the album, etc.) may be viewable in different layouts/views responsive to user input. Transitions between views may be performed using an animation that bridges one view to a next view.

The photos 212 of the album may include original versions of the photos selected for the cover photo 204 and highlight photoset 208, as well as any or all other photos of the album. Each of the photos 212 may be presented as thumbnail images (e.g., smaller sized versions of the photos) that are selectable to view the original versions, for example. In this way, the cover photo and highlight photoset may be representative of all of the photos that are in the album by providing a quick view of a subset of the photos (e.g., and of relevant regions of the photos in that subset) that are likely to produce the highest emotional connection between the user and the album.

Figure 3:
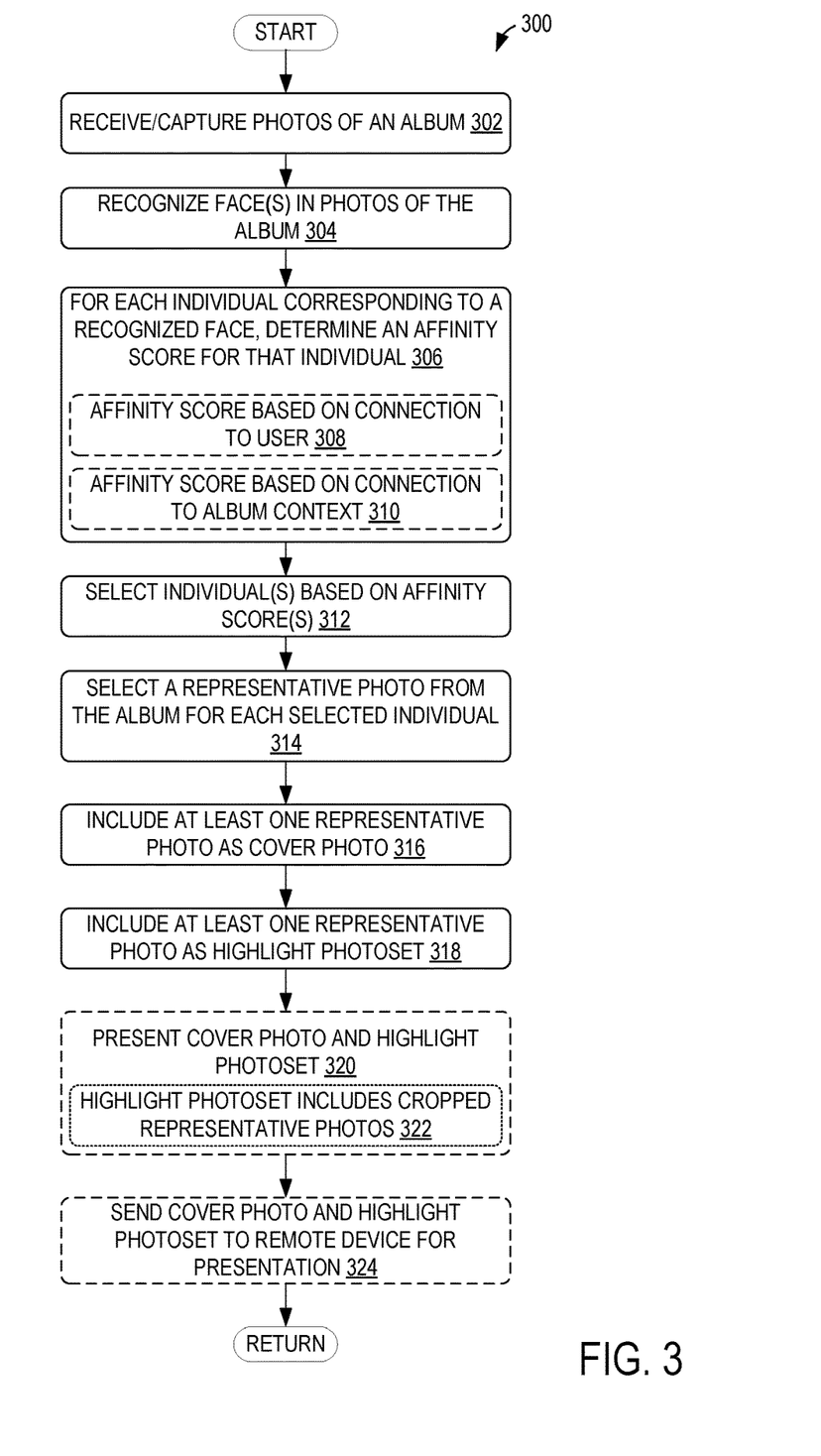
FIG. 3 is a flow chart of an example method for selecting representative photos for a photo album.

FIG. 3 is a flow chart of a method 300 for selecting representative photos of an album based on determination and application of an affinity score for individuals imaged in the photos of the album. Method 300 may be performed by a single device, such as an end-user device (e.g., a device on which photos are captured and/or displayed as albums) or a server computing device(s) (e.g., a device for processing photos of an album and returning information to another device so that the other device may display the photo album with representative photos as a cover photo and a highlight photoset). The end-user device may include a mobile device (e.g., a smartphone, tablet, laptop, digital camera, and/or other mobile computing device), a personal computing device (e.g., a desktop computer), a home entertainment device (e.g., a video game console, a video streaming device, and/or other consumer computing device). The server computing device may include a remote device from an end-user device, which may be connectable via a network (e.g., a cloud computing device). In some examples, the method 300 may be performed by a combination of two or more devices (e.g., where one or more processes of method 300 are performed by an end-user device that displays the photo album and one or more other processes of method 300 are off-loaded to a server computing device, or server computing system with multiple devices, and a result returned to the end-user device).

At 302, the method includes receiving and/or capturing photos of an album. For example, a user (e.g., an owner of the album and/or user of the device performing method 300) may select already captured photos and/or a category of already captured photos from a local or remote storage device for inclusion in the album. The user may additionally or alternatively indicate that one or more photos that will be captured (e.g., the next [x] number of photos to be captured, or the next [x] number of photos that are captured that meet criteria such as date, time, location, and/or subject criteria) by an end-user device including a camera are to be included in an album. In still other examples, one or more photos may be automatically added to an album and/or an album including one or more photos may be automatically created at or prior to 302 based on features of the photos such as date, time, location, and/or subject of the photos.

At 304, the method includes recognizing one or more faces in the photos of the album. A single device (e.g., an end-user device and/or a server computing device) may perform the facial recognition in some examples. In other examples, an end-user device may send one or more photos to a server computing device for facial recognition. In such an example, the end-user device may identify the recognized faces based on data received from the server computing device. Facial recognition may be performed in any suitable manner, including but not limited to performing edge analysis or other object recognition techniques to locate faces and/or facial features in the photos, and comparing the located faces/facial features to those of known individuals. The known individuals may include individuals whose faces/facials features are known to the system(s) performing the facial recognition (e.g., individuals whose faces/facial features are stored in a database accessible by the facial recognition system). In this way, the known individuals may be known to the system, even if the known individuals are not known or well-known by the user. In some examples, the recognition of faces may correspond to the recognition that a feature in a photo is a face. In other words, a face may be recognized as a face and assigned an identifier (e.g., unknown face x), even if the system has no other identifier for the face. Such an unknown face may also be compared to other faces in the album in order to determine if the unknown face appears multiple times within the album and/or appears with the user and/or other known individuals (e.g., indicating a significance of that face relative to other faces that do not frequently appear in the album or with the user/known individuals).

The method includes, for each known individual corresponding to a recognized face, determining an affinity score for that individual, as indicated at 306. As used herein, references to calculating, assigning, or otherwise generating a score, weight, or ranking may correspond to any suitable assessment of relative value. For example, the affinity score may be based on a connection of the known individual to the user, as indicated at 308, and/or a connection of the known individual to the context of the album, as indicated at 310. Accordingly, scores, weights, and/or rankings applied to that individual may be an assessment of that individual's connection to the user and/or to the context of the album relative to other individuals. The connection of the individual to the user may include a relationship of the individual to the user (e.g., familial relationship, friendship, working relationship, mutual acquaintance, and/or other relationship) and may indicate a level of emotional connection that the user may have toward that individual. For example, a best friend of a user may be given a higher value in a user-connection portion of an affinity score calculation than a distant cousin of the user.

The connection of the individual to the album context may include a connection of the individual to an event being captured in the album, a connection of the individual to the user that created/owns the album, and/or a connection of the individual to a date/location of the album. For example, an individual whose birthday occurs on the date of the album and/or who appears frequently in the album may be given a higher value in an album context connection portion of an affinity score calculation than an individual who rarely appears in the album and has no known connection to the date of the album. In some examples, an individual may be given points for each connection to the user/album context (e.g., with higher points given for stronger connections—such as the best friend vs. distant cousin connection described above, where the best friend is a stronger connection to the user than the distant cousin).

The points may be weighted based on an importance of the associated connection to the user (e.g., a strong relationship connection may be weighted higher than a strong album context connection, or vice versa; or a strong connection to a date of the album may be weighted higher than a strong [e.g., frequent] presence of the individual in the album). The weighting and/or other aspects of affinity scoring may be predetermined and/or set/modified by the user. Each score/value assessed may be a contributing factor to the overall affinity score. By weighting different contributing factors, known individuals that may otherwise be viewed as having a weak connection to the user, may be given an overall affinity score that is comparable to an individual that has a strong connection to the user in light of additional contributing connections. For example, although a coworker may initially be viewed as having a weaker connection to the user than a best friend, the coworker may appear more frequently in the album than the best friend and/or in more photos alongside the user than the best friend. The coworker may also have a connection to a date of the album (e.g., the album includes photos captured on the coworker's birthday). These connections of the coworker to the user and the album context may raise the coworker's overall affinity score for that album to a value that is similar or higher than the best friend. Additional features of the determination of the affinity score (e.g., sources of data used for determining the affinity score) are described in more detail in FIGS. 4 and 5.

At 312, the method includes selecting known individuals based on the affinity scores of those individuals. For example, the determination of known individuals (e.g., individuals whose faces are recognized in the photos as corresponding to a name or other identifier of the individual in a database) may be used to form a set of known individuals that are present (e.g., captured) in the photo album. As each (or at least a portion) of the known individuals may be assigned an affinity score (e.g., calculated as described above and with respect to FIGS. 4 and 5), the affinity score may be used to determine how relevant each individual is to the user/album. Accordingly, those individuals with an affinity score that meets certain criteria may be selected to be included in a subset of known individuals. For example, the criteria may include a predetermined number of known individuals having the highest affinity scores of the set of known individuals, and/or all or a predetermined number of known individuals having an affinity score that exceeds a threshold. Other criteria may be used to select the known individuals to be included in the subset (e.g., known individuals having particular connections to the user/album, etc.).

In some examples, rules associated with the assignment and/or application of affinity scores may include one or more machine learning models that a formed or evolve over time based on observed data. For example, the machine learning models may receive hand-tagged data and/or observe end-users as the end-users make manual-override changes to faces that are shown in album covers or highlight photosets. Based on such data, the machine learning models may adjust weighting, scores, and/or the application thereof in order to generate affinity scores.

At 314, the method includes selecting a representative photo from the album for each selected individual of the subset. The representative photos may be selected as the highest quality photos of the selected individuals, the photos having the most unobstructed and/or clearest view of the individual's face, and/or based on any other suitable parameter. For example, the quality of a given photo may be measured using one or more aspects such as sharpness (e.g., in or out of focus, with or without motion blur, etc.), exposure (e.g., brightness level, white balance, etc.), resolution, distortion, and/or other indicators of quality. Such aspects may be compared with comparable aspects of other photos of a given selected individual and/or to a threshold in order to provide an overall indication of photo quality.

As indicated at 316, at least one of the representative photos may be included in the album as the cover photo (e.g., selected to be used as the cover photo). At least one of the representative photos may be included in the highlight photoset, as indicated at 318. In some examples, the photo selected for the cover photo may also be included in the highlight photoset. The cover photo may be selected from the representative photos based on the affinity score of the individual(s) included in that photo, the number of individuals recognized in that photo, and/or the quality, size, content, date, filename, or other feature of that photo relative to other photos in the selected representative photos. As described above, the representative photos used in the highlight photoset may be selected based on the associated affinity scores of those photos.

Method 300 optionally includes presenting the cover photo and highlight photoset, as indicated at 320. For example, if method 300 is performed by an end-user device, the end-user device may present the cover photo and highlight photoset (e.g., where the highlight photoset includes cropped representative photos, as indicated at 322 and illustrated in FIG. 2). If method 300 is performed by a server computing device (e.g., a device remote from the end-user device), the method may include sending the cover photo and highlight photoset (or identifiers thereof) to a remote device (e.g., the end-user device) for presentation, as indicated at 324. In some examples, method 300 may be initialized automatically upon creation of an album and/or responsive to user input requesting album creation and/or selection of representative photos for a created album.

Figure 4:
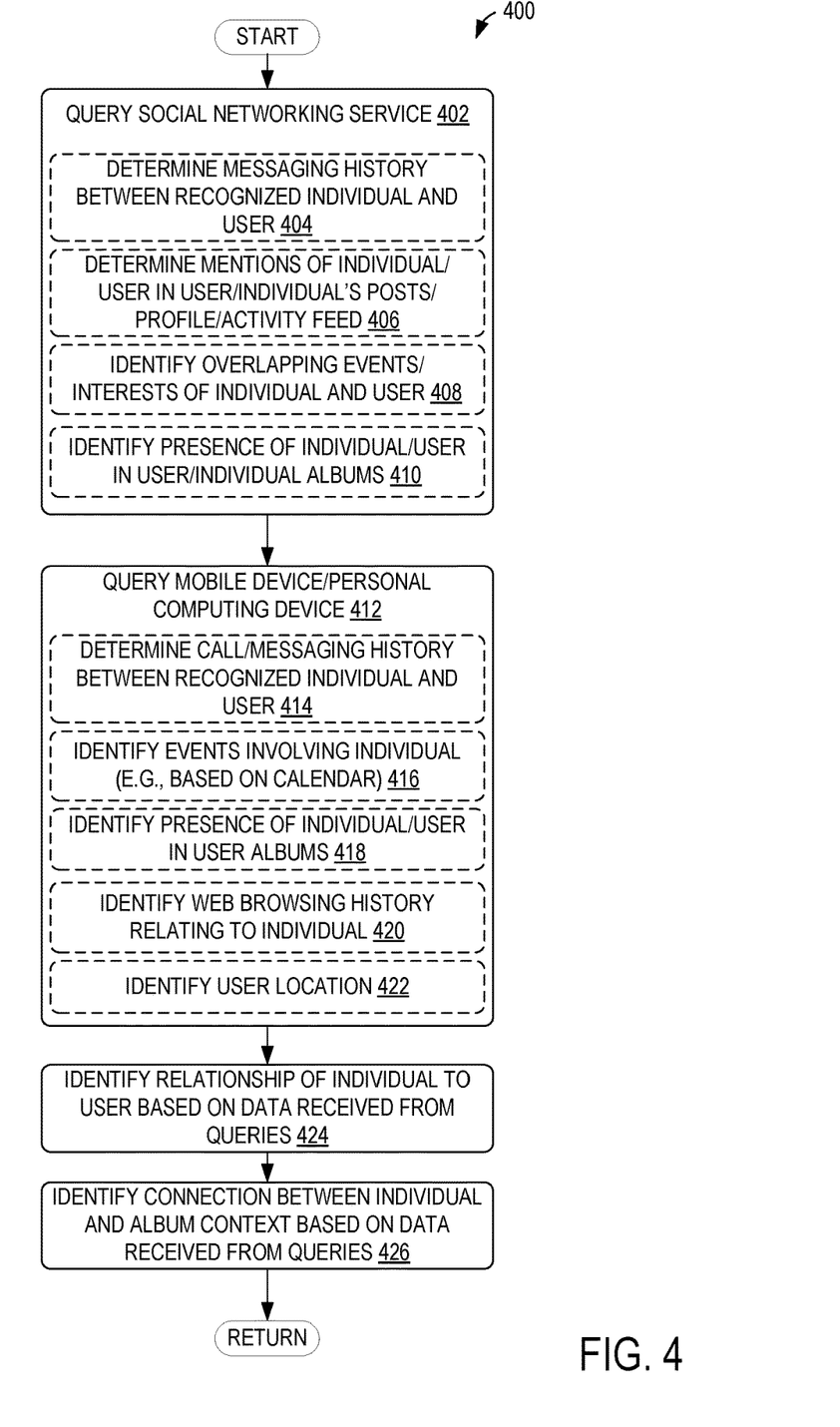
FIG. 4 is a flow chart of an example method for collecting information and determining connections between an individual and a) a user and b) an album context.
Figure 5:
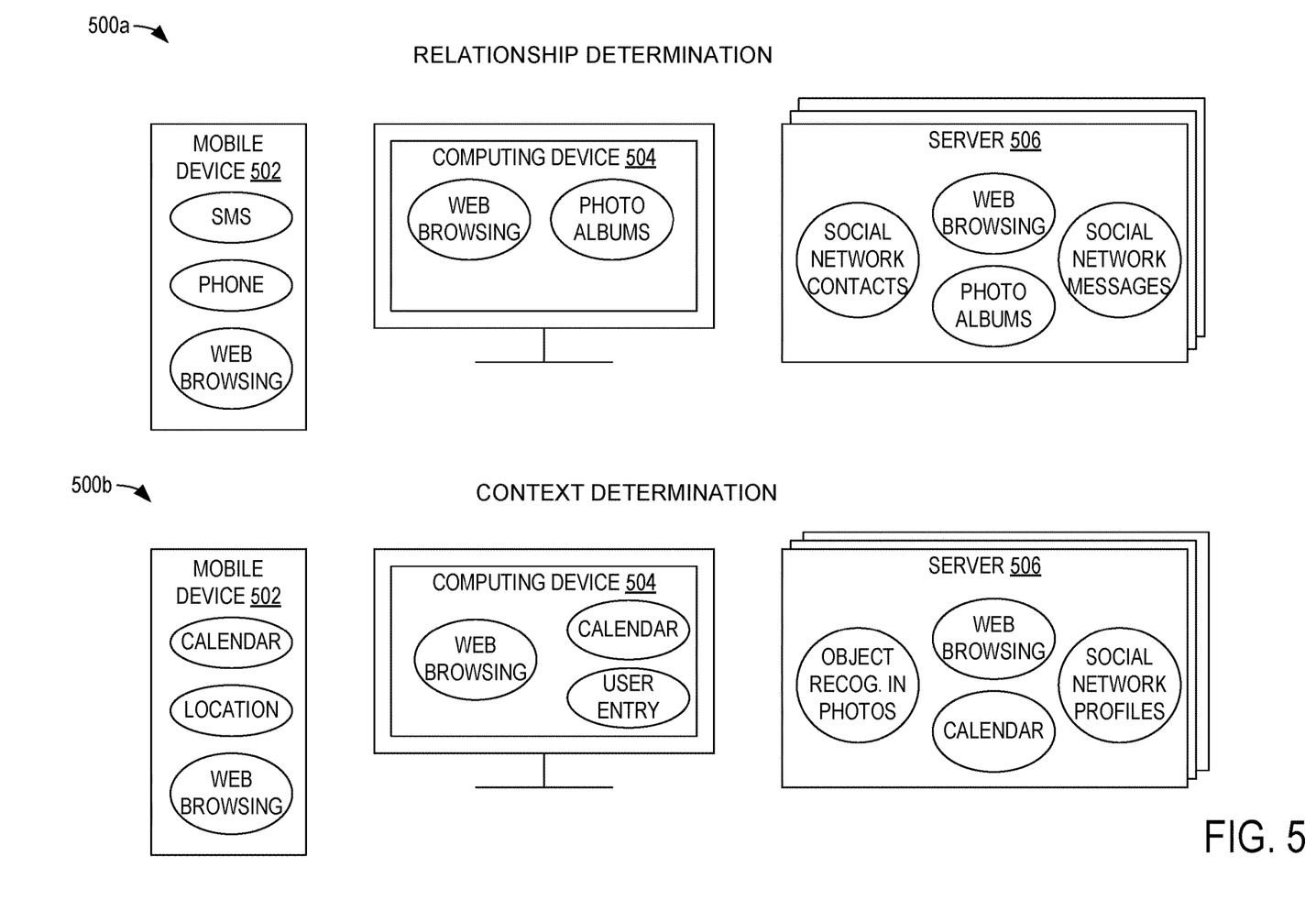
FIG. 5 shows example block diagrams of devices that may be queried for information to determine user relationships and album contexts.

FIGS. 4 and 5 illustrate information sources for retrieving data used in determining an affinity score (e.g., the affinity score discussed with respect to method 300 of FIG. 3). The information sources and associated retrieved data described with respect to FIGS. 4 and 5 are exemplary, and additional or alternative data may be retrieved and evaluated in order to determine the above-described affinity score. Furthermore, any combination of the described data may be used in calculation of an affinity score (e.g., based on the information that is available for a given user/known individual). FIG. 4 is a flow chart of a method 400 for retrieving and evaluating data relating to a user, a known individual (e.g., a recognized individual in a photo album of the user), and/or a photo album of the user. For example, method 400 may be performed at and/or as part of process 306 of method 300 illustrated in FIG. 3.

At 402, method 400 includes querying a social networking service. For example, the user, the known individual, and/or individuals relating to the known individual may be users of one or more social networking services and/or maintain a profile or account at a social networking service. The social networking activity/profile/account may indicate friends/relationships between the user and other individuals, groups, likes, follows, posts, and/or other information indicating user affinities. The information may be compared to that of known individuals in order to determine overlaps indicating similar interests/connections. The social networking query may be used to determine messaging history between a known/recognized individual and the user (e.g., messaging via the social networking service and/or another service), as indicated at 404. For example, a frequency and/or number of messaging between the user and the individual may indicate an associated relationship (e.g., where a higher frequency/greater amount of messaging indicates a closer relationship than a lower frequency/amount of messaging). As will become apparent in the following description, such data may only serve as one indicator of relationship, and other data (e.g., the other data described in method 400) may be combined with these indicators to form an overall relationship score (e.g., a score utilized in determining the affinity score, which may be based on a relationship score and an album context score).

As indicated at 406, the social networking service may be queried to determine mentions of the individual and/or user in one another's posts, profiles, and/or activity feeds for the social networking service. For example, a user may often tag a known individual in status updates or location check-ins, indicating that the user is often socializing with the known individual. Each mention may be tallied in order to indicate a likely affinity of the user to that known individual (e.g., where a greater number of mentions indicates a likely stronger connection between the user and the known individual). Mentions may also be evaluated from other social networking profiles/accounts (e.g., of mutual friends between the user and the known individual), as a third party may post and/or check-in with both the user and the known individual, even when the user/individual do not include such posts/check-ins on their own accounts/profiles.

As indicated at 408, the social networking service may be queried to identify overlapping events and/or interests between the user and the known individual. For example, a user and a known individual with many common interests and/or who attend the same events may be closer than users and individuals with fewer common interests and/or who attend fewer and/or no events together. The overlapping events may also indicate a context of the album and a connection of the individual thereto. For example, an album including photos that were captured on the same day as an event that both the user and the individual attended may be indicative of a connection between the individual and the context of the album.

As indicated at 410, the social networking service may be queried to identify the presence and/or frequency of appearance of the individual and/or user in one another's photo albums (e.g., the photo albums hosted by and/or linked to via the social networking service). For example, a user and a known individual who appear in one another's photos frequently and/or appear in a large number of one another's photos may have a closer relationship than a user/individual who appear in one another's photos less frequently and/or appear in a fewer number of one another's photos.

The frequency/number of appearances in photo albums may also indicate a connection between the individual and the context of the photo album being represented (e.g., by performing method 300 of FIG. 3). For example, a high frequency of appearances of the individual in the photo album being represented may be one indicator of a higher connection of the individual to the photo album (relative to individuals who appear less frequently in the album). The frequency of appearance of the individual with the user and/or other known individuals in the album may indicate a higher connection of the individual to the photo album and/or the user (relative to individuals who appear with the user less frequently in the album). As discussed above, the frequency of appearance may not be the only metric evaluated when determining relevance of an individual to a context of the album and/or when determining an overall affinity score for the individual. For example, a close friend may be capturing a majority of the photos of the album, and thus appear less frequently in the album, but may still be important to the context of the album (e.g., if the album is associated with that individual's birthday or a trip taken by that individual and the user) and/or the user (e.g., if that individual is the user's best friend). Thus, while the frequency of appearance in the album may be low for a given individual, the individual may still have an overall high affinity score due to the contribution of connections identified by other data.

At 412, the method includes querying a mobile device and/or personal computing device of the user. For example, this querying may be used to determine call and/or messaging (e.g., SMS/MMS, email, etc.) history between the known/recognized individual and the user, as indicated at 414. As described above with respect to the social networking service messaging, frequent and/or large amounts of messaging between the user and the individual may indicate a closer relationship than less frequent and/or smaller amounts of messaging.

As indicated at 416, the mobile device and/or personal computing device may be queried to identify events involving the individual (e.g., based on a calendar of the user and/or another event tracking service/application running on the user's device). For example, an individual that is included in a large number of events in the user's calendar and/or an individual who has overlapping events with the user (e.g., as determined by querying the social networking profile of the individual) may be closer to the user than other individuals who do not have as many overlapping events. The events of the user may also be evaluated to determine a context of an album (e.g., if the date/time/location of the events overlap with the date/time/location of the album and/or if descriptions of the album and events overlap).

As indicated at 418, the mobile device and/or personal computing device may be queried in order to identify the presence of the individual and/or the individual with the user in the user's albums (e.g., other albums than the album for which representative photos are being selected according to method 300 of FIG. 3, or the album being represented). For example, a high frequency of appearance of the individual in the user's albums and/or a high frequency of appearance of the individual with the user in the user's albums may indicate a close relationship between the user and the individual. A high frequency of appearance of the individual in the album being represented may indicate a connection of the individual to the context of the album. In determining frequency of appearance, appearances with the user may be ranked/weighted higher than appearances without the user in some examples. In other examples, all appearances may be weighted/ranked the same as one another.

As indicated at 420, the mobile device and/or personal computing device may be queried in order to identify web browsing history of the user that relates to the individual. For example, web browsing history may be used to indicate interests of the user (e.g., favorite movies, television shows, music, etc.) and individuals associated with those interests (e.g., favorite actors/actresses, singers, chefs, etc.). Such interests may also be determined by examining social networking activity of the user (e.g., following or liking a celebrity on a social networking service). Photos with individuals associated with the interests (e.g., celebrities) may be weighted/ranked heavily when determining an affinity score for those individuals, as such individuals may not appear in the user's other photos/everyday life, but may hold high significance to the user, indicating a memorable occurrence within the context of the photo album (e.g., during a vacation). The web browsing history may also be used to determine a context of an album. For example, a user may perform a large number of web searches relating to planning a trip prior to creating the album. An overlap between the web searches and the location of the photos of the album may indicate that the album relates to the planned trip.

As indicated at 422, the mobile device and/or personal computing device may be queried in order to identify a user location (e.g., a current location and/or locations observed over time/frequented by the user to form a travel history for that user). For example, locations that are frequented by the user may be compared to locations frequented by the individual and/or locations at which photos of the album were taken in order to determine a relationship to the individual and/or a context of the album.

At 424, the method includes identifying a relationship of the individual to the user based on data received from the queries. Any suitable computation of the queried data may be used to determine the relationship. For example, each connection between the user and the individual may be assigned a value (e.g., indicating a strength of that connection—for example, the presence of an individual in any photo of the user may be a connection between the user and the individual, but a first individual that is in a first, higher number of the user's photos may be assigned a higher value for that connection than a second individual that is in a second, lower number of the user's photos). Furthermore, each connection may be assigned a weight indicating the importance of that connection to the overall relationship score and/or to the overall affinity score. For example, a connection between an individual and a search history of the user (e.g., indicating that the individual is a favorite actor/singer/etc. of the user) may be weighted higher than a connection between an individual and user's location.

At 426, the method includes identifying a connection between the individual and an album context based on the data received from the queries. As described above with respect to the relationship determination, each connection of the individual to the album context may be assigned a value and weighted. The values and weights applied to these connections (e.g., for the relationship determination and the album context determination) may be predetermined and/or set/configurable by user input. In some examples, the user may identify a weighting to be used on a per-album basis. For example, a user may configure an album relating to a birthday such that an individual's connection to the album context is weighted more heavily for that album than for an album relating to a vacation. The connections to the album context and to the user may be combined and used to determine an affinity score as described above with respect to method 300 of FIG. 3.

FIG. 5 shows example block diagrams of devices that may be queried to determine connections for an individual. Diagram 500a shows devices used for determining connections of an individual to a user (e.g., a relationship between the user and the individual), and diagram 500b shows devices used for determining connections of an individual to a user album (e.g., a connection between the individual and the album context). Block diagrams 500a and 500b are exemplary, and any suitable device may be queried to gather any suitable data for determining connections for an individual. For example, devices/data described in diagram 500a for relationship determination may additionally or alternatively be used for album context connection determination, and vice versa.

For determining a relationship between the user and the individual, a mobile device 502 of the user may be queried to identify messaging (e.g., SMS messaging) and/or phone conversations between the user and the individuals. The mobile device 502 may also be queried for web browsing information relating to the individual. A personal computing device 504 of the user may be queried to identify further web browsing information relating to the individual, as well as photo albums local to the machine that may include photos of the individual. For example, a user may backup his/her photos to a personal computing device, so the personal computing device may serve as an archive for the user's photos. The web browsing information may also include web-based messaging (e.g., video conferencing, instant messaging, emailing, etc.) that may occur between the user and the individual.

A server computing device 506 may be queried to identify social networking contacts, third-party-hosted web browsing information, cloud/network-stored photo albums, and/or social networking messages. Server computing device 506 may be representative of any number of server computing devices, such as the servers for each social networking service to which the user belongs.

For determining an album context for a user's album, the user's mobile device 502 may be queried to identify calendar data (e.g., date/time/location of significant events for the user), location information, and/or web browsing data. The user's personal computing device 504 may be queried to identify further web browsing data, calendar information (e.g., as discussed above with respect to the photo albums, the personal computing device 504 may archive calendar information for evaluation), and/or user entry (e.g., a user may specify a context of the album when creating the album). The server computing device(s) 506 may be used to perform object recognition in the photos (e.g., photos that include a birthday cake may indicate that the album is related to a birthday party; identified landmarks may indicate that the album is related to a vacation and/or may indicate a location at which the photos were taken). The server computing device(s) may also be queried for web browsing information, calendar data (e.g., a cloud-based calendar for the user), and social networking profiles of other individuals (e.g., to determine overlapping events for individuals and the album). For example, the album may take place on an individual's birthday, but only the individual may have the birthday identified on his/her social networking profile. This information may help to identify the context of the album as relating to the individual's birthday (and identify the individual's connection to the album), even if that birthday is not an event on the user's calendar.

In the above examples, various data may be used to calculate an affinity of a recognized individual to a user. The affinity may be indicative of the individual's relationship to both the user and the album context. By using such varied information sources, the system may make a more informed determination of relationships between the individual and the user/album context. Furthermore, an identified album context may indicate connections other than the relationship between the user and the individual. A connection between an individual and such an album context may provide more insight into the overall importance of the individual to that album, and result in representative photo selections that have more significance to the user and the album than photo selections that only factor user/individual relationships based on a few metrics. Representative photos that are significant to both the user and the album context may assist the user in remembering the context of the album and emotionally connecting to the album, even before viewing all of the photos in the album.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
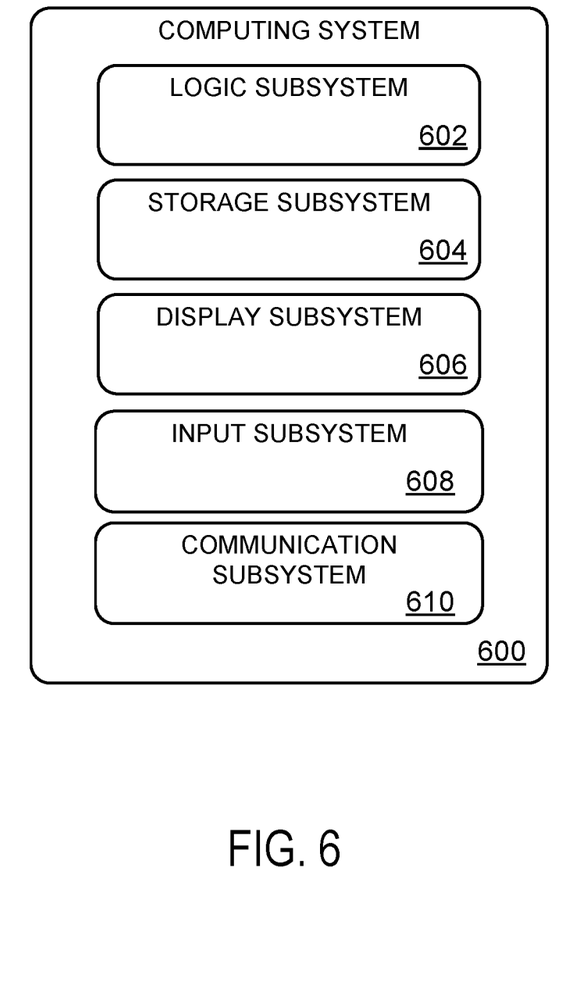
FIG. 6 is a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides computing device for selecting one or more representative photos of an album comprising one or more photos, the computing device including a display, a logic device, and a storage device storing instructions executable by the logic device to recognize faces in each photo of the album, each recognized face corresponding to a known individual, for each known individual recognized in one or more photos of the album, determine an affinity score for that known individual, the affinity score indicating a connection of that known individual to a) a user of the computing device and b) a context corresponding to the album, select one or more known individuals based on the affinity score to be included in a subset of the known individuals recognized in one or more photos of the album, for each of the one or more known individuals in the subset, select a representative photo from the album including a recognized face of that known individual to be included in one or more of a highlight photoset and a cover photo for the album, and present, on the display, the cover photo including a first one of the representative photos, and the highlight photoset including at least a second one of the representative photos. In such an example, the highlight photoset may additionally or alternatively include a cropped version of at least the second one of the representative photos. In such an example, the cropped version of the second one of the representative photos may additionally or alternatively include a single face, the single face being the recognized face corresponding to a known individual in the subset of known individuals. In such an example, the cropped version of at least the second one of the representative photos may additionally or alternatively be presented as an overlay at least partially overlaying the cover photo. In such an example, the affinity score may additionally or alternatively be determined based on a relationship of the known individual with the user, the relationship being determined based on one or more of user selection and examination of one or more of a) social networking activity, b) a social network profile, c) messaging history for the user, d) travel history of the user, and e) a frequency of presence of the known individual in other photos associated with the user. In such an example, the context of the album may additionally or alternatively be determined based on one or more of a) object recognition of objects in the one or more photos, b) identification of date, time, or location of the one or more photos, and c) a profile of one or more of the user and the known individuals. In such an example, for each known individual, selecting the representative photo from the album including a recognized face of that known individual may additionally or alternatively include selecting the representative photo based on a quality of the recognized face of that known individual in each photo of the album that includes the known individual. In such an example, the cover photo may additionally or alternatively include one or more of a cropped version and a resized version of the first one of the representative photos. In such an example, the resized version of the first one of the representative photos may additionally or alternatively be presented as the cover photo in a first user interface view presented via the display and wherein the cropped version of the first one of the representative photos is presented as the cover photo in a second user interface view presented via the display. In such an example, the highlight photoset may additionally or alternatively be presented as an overlay over at least part of the cropped version of the first one of the representative photos presented in the second user interface view. Any or all of the above-described examples may be combined in any suitable manner in various implementations.

Another example provides, on a computing device, a method for selecting representative photos of a photo album, the method including identifying faces in each photo of the photo album, each identified face corresponding to a known individual, for each known individual recognized in one or more photos of the photo album, identifying an affinity score for that known individual, the affinity score indicating a connection of that known individual to a) a user of the computing device and b) a context corresponding to the photo album, selecting one or more known individuals based on the affinity score to be included in a subset of the known individuals recognized in one or more photos of the photo album, for each of the one or more known individuals in the subset, selecting a representative photo from the photo album including an identified face of that known individual to be included in one or more of a highlight photoset and a cover photo for the photo album, and presenting, on the display the cover photo including a first one of the representative photos, and the highlight photoset including at least a second one of the representative photos. In such an example, identifying faces in each photo of the photo album may additionally or alternatively include sending one or more photos from the photo album to a remote computing device and receiving an indication of recognized faces in the one or more photos from the remote computing device. In such an example, identifying the affinity score for the known individual may additionally or alternatively include receiving the affinity score from a remote computing device. In such an example identifying the affinity score for the known individual includes receiving information from a remote computing device indicating one or more of the connection of the known individual to the user of the computing device and the connection of the known individual to the context corresponding to the photo album. In such an example, the method may additionally or alternatively further include cropping one or more of the representative photos selected for the one or more known individuals in the subset, and wherein the highlight photoset includes a cropped version of at least the second one of the representative photos. Any or all of the above-described examples may be combined in any suitable manner in various implementations.

Another example provides a first computing device for selecting one or more representative photos of an album comprising one or more photos, the computing device including a network interface, a logic device, and a storage device storing instructions executable by the logic device to receive, from a second computing device via the network interface, one or more photos of the album, recognize faces in each received photo of the album, each recognized face corresponding to a known individual, for each known individual recognized in one or more of the received photos of the album, determine an affinity score for that known individual, the affinity score indicating a connection of that known individual to a) a user of the second computing device and b) a context corresponding to the album, select one or more known individuals based on the affinity score to be included in a subset of the known individuals recognized in one or more photos of the album, for each of the one or more known individuals in the subset, select a representative photo from the album including a recognized face of that known individual to be included in one or more of a highlight photoset and a cover photo for the album, and transmit, to the second computing device via the network interface for display at the second computing device the cover photo including a first one of the representative photos, and the highlight photoset including at least a second one of the representative photos. In such an example, the network interface may additionally or alternatively include a wireless network interface. In such an example, determining the affinity score for the known individual may additionally or alternatively include querying a remote computing device for user information relating to the known individual. In such an example, the affinity score may additionally or alternatively be determined based on a relationship of the known individual with the user, the relationship being determined based on one or more of user selection and examination of one or more of a) social networking activity, b) a social network profile, c) messaging history for the user, d) travel history of the user, and e) a frequency of presence of the known individual in other photos associated with the user. In such an example, the context of the album may additionally or alternatively be determined based on one or more of a) object recognition of objects in the one or more photos, b) identification of date, time, or location of the one or more photos, and c) a profile of one or more of the user and the known individuals. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for selecting one or more representative photos of an album comprising one or more photos, the computing device comprising:
   a display;
   a logic device; and
   a storage device storing instructions executable by the logic device to:
   recognize faces in some photos of the album, each recognized face corresponding to a known individual;
   for some known individuals recognized in one or more photos of the album, determine an affinity score for each of those known individuals, the affinity score indicating a connection of each of those known individuals to a) a user of the computing device and b) a context corresponding to the album;
   select one or more known individuals based on the affinity score to be included in a subset of the known individuals recognized in the one or more photos of the album;
   for each of at least one known individual in the subset, select a representative photo from the album including a recognized face of that known individual for representing the album; and
   present a representation of the album on the display, the representation including one or more of the representative photos.

2. The computing device of claim 1, wherein the representative photo is selected for inclusion in one or more of a highlight photoset and a cover photo, the cover photo including a first one of the representative photos and the highlight photoset including at least a second one of the representative photos, and wherein the highlight photoset includes a cropped version of at least the second one of the representative photos.

3. The computing device of claim 2, wherein the cropped version of the second one of the representative photos includes a single face, the single face being the recognized face corresponding to one known individual in the subset of known individuals.

4. The computing device of claim 2, wherein the cropped version of at least the second one of the representative photos is presented as an overlay at least partially overlaying the cover photo.

5. The computing device of claim 1, wherein the affinity score is determined based on a relationship of the known individual with the user, the relationship being determined based on one or more of user selection and examination of one or more of a) social networking activity, b) a social network profile, c) messaging history for the user, d) travel history of the user, and e) a frequency of presence of the known individual in other photos associated with the user.

6. The computing device of claim 1, wherein the context of the album is determined based on one or more of a) object recognition of objects in the one or more photos, b) identification of date, time, or location of the one or more photos, and c) a profile of one or more of the user and the known individuals.

7. The computing device of claim 1, wherein for each of some known individuals, selecting the representative photo from the album including a recognized face of that known individual comprises selecting the representative photo based on a quality of the recognized face of that known individual in each photo of the album that includes the known individual.

8. The computing device of claim 1, wherein the representative photo is selected for inclusion in one or more of a highlight photoset and a cover photo for representing the album, the cover photo including a first one of the representative photos and the highlight photoset including at least a second one of the representative photos, and wherein the cover photo includes one or more of a cropped version and a resized version of the first one of the representative photos.

9. The computing device of claim 8, wherein the resized version of the first one of the representative photos is presented as the cover photo in a first user interface view presented via the display and wherein the cropped version of the first one of the representative photos is presented as the cover photo in a second user interface view presented via the display.

10. The computing device of claim 9, wherein the highlight photoset is presented as an overlay over at least part of the cropped version of the first one of the representative photos presented in the second user interface view.

11. On a computing device, a method for selecting representative photos of a photo album, the method comprising:
   identifying faces in some photos of the photo album, each identified face corresponding to a known individual;
   for each of some known individuals recognized in one or more photos of the photo album, identifying an affinity score for that known individual, the affinity score indicating a connection of that known individual to a) a user of the computing device and b) a context corresponding to the photo album;
   selecting one or more known individuals based on the affinity score to be included in a subset of the known individuals recognized in one or more photos of the photo album;
   for each of at least one known individual of the one or more known individuals in the subset, selecting a representative photo from the photo album including an identified face of that known individual for representing the photo album; and
   presenting a representation of the photo album on the display, the representation including one or more of the representative photos.

12. The method of claim 11, wherein identifying faces in some photos of the photo album includes sending one or more photos from the photo album to a remote computing device and receiving an indication of recognized faces in some of the one or more photos from the remote computing device.

13. The method of claim 11, wherein identifying the affinity score for the known individual includes receiving the affinity score from a remote computing device.

14. The method of claim 11, wherein identifying the affinity score for the known individual includes receiving information from a remote computing device indicating one or more of the connection of the known individual to the user of the computing device and the connection of the known individual to the context corresponding to the photo album.

15. The method of claim 11, further comprising cropping one or more of the representative photos selected for the one or more known individuals in the subset, and wherein a highlight photoset includes a cropped version of at least one representative photo.

16. A computing device for selecting one or more representative photos of an album comprising one or more photos, the computing device comprising:
a display;
a logic device; and
a storage device storing instructions executable by the logic device to:
recognize at least one face in at least one photo of the album, each recognized face corresponding to a known individual;
for at least one known individual recognized in the one or more photos of the album, determine an affinity score for that known individual, the affinity score indicating a connection of that known individual to one or more of a) a user of the computing device and b) a context corresponding to the album;
select one or more known individuals based on the affinity score to be included in a subset of the known individuals recognized in the one or more photos of the album;
for each of at least one known individual in the subset, select a representative photo from the album including a recognized face of that known individual for representing the album; and
present a representation of the album on the display, the representation including one or more of the representative photos.

17. The first computing device of claim 16, wherein the representative photo is selected for inclusion in one or more of a highlight photoset and a cover photo, the cover photo including a first one of the representative photos and the highlight photoset including at least a second one of the representative photos, and wherein the highlight photoset includes a cropped version of at least one representative photo.

18. The computing device of claim 16, wherein determining the affinity score for the known individual includes querying a remote computing device for user information relating to the known individual.

19. The computing device of claim 16, wherein the affinity score is determined based on a relationship of the known individual with the user, the relationship being determined based on one or more of user selection and examination of one or more of a) social networking activity, b) a social network profile, c) messaging history for the user, d) travel history of the user, and e) a frequency of presence of the known individual in other photos associated with the user.

20. The computing device of claim 16, wherein the context of the album is determined based on one or more of a) object recognition of objects in the one or more photos, b) identification of date, time, or location of the one or more photos, and c) a profile of one or more of the user and the known individuals.

21. The computing device of claim 1, wherein the instructions are executable to select the representative photo from the album including the recognized face of that known individual to be included in one or more of a highlight photoset and a cover photo-for representing the album.

22. The method of claim 11, wherein, for each of the at least one known individual of the one or more known individuals in the subset, selecting the representative photo from the photo album including the identified face of that known individual comprises selecting the representative photo to be included in one or more of a highlight photoset and a cover photo for representing the photo album.

23. The computing device of claim 16, wherein the instructions are executable to, for each of the at least one known individual in the subset, select the representative photo from the album including the recognized face of that known individual to be included in one or more of a highlight photoset and a cover photo for representing the album.

* * * * *